United States Patent [19]

Zampini et al.

[11] Patent Number: 5,420,933
[45] Date of Patent: May 30, 1995

[54] UP AND DOWN-LOADABLE VTR CONFIGURATION FOR AN AUDIO FOLLOW VIDEO MIXER

[75] Inventors: Michael A. Zampini, Boca Raton; Donald E. Davis, Margate; Joseph J. Dombrowski, Hollywood, all of Fla.

[73] Assignee: Sony Electronics Inc., Park Ridge, N.J.

[21] Appl. No.: 135,351

[22] Filed: Oct. 13, 1993

[51] Int. Cl.⁶ .................................. H04B 1/00
[52] U.S. Cl. ..................................... 381/119
[58] Field of Search ...................... 381/119, 28

[56] References Cited

U.S. PATENT DOCUMENTS 5,175,771  12/1992  Zampini et al. .
5,212,733   5/1993  DeVitt et al. ................. 381/119
5,230,024   7/1993  Zampini et al. .

OTHER PUBLICATIONS

Commonly owned co-pending application, Ser. No. 08/142,974, filed on Oct. 29, 1993.
Commonly owned co-pending application, Ser. No. 08/119,835, filed on Sep. 13, 1993.

Primary Examiner—Forester W. Isen
Attorney, Agent, or Firm—Ronald P. Kananen

[57] ABSTRACT

Disclosed is an apparatus for configuring an audio follow video mixer used to process audio signals input from several multi-channel devices, such as VTRs. Configuration of the audio follow video mixer system can be achieved either through several input modules which couple the multi-channel devices to the mixer, or preset configurations can be provided to the input modules and remotely located devices, such as a video editor, through a serial interface module.

21 Claims, 8 Drawing Sheets

UP AND DOWN-LOADABLE VTR CONFIGURATION FOR AN AUDIO FOLLOW VIDEO MIXER

CROSS REFERENCE TO RELATED APPLICATIONS AND PATENTS

Reference is made to the following commonly owned-co-pending applications: "VTR CONFIGURATION OF A MODULAR AUDIO FOLLOW VIDEO MIXER," Ser. No. 08,119,835, filed on Sep. 13, 1993; "MANUAL CROSS FADE LEARN FEATURE FOR AUDIO FOLLOW VIDEO MIXER", Ser. No. 08/142,974, filed on Oct. 29, 1993. Reference is made to commonly owned U.S. Pat. No. 5,175,771, entitled "VCA DECODING SCHEME FOR MULTIPLE VTR CONFIGURATION OF AN AUDIO FOR VIDEO MIXER", and U.S. Pat. No. 5,230,024 entitled "VTR CONFIGURATION DECODING SCHEME FOR AUDIO MIXER PARALLEL EDITOR INTERFACE."

FIELD OF THE INVENTION

This invention relates to the control of a configuration of multi-channel devices, such as video tape recorders (VTRs), associated with an audio follow video mixer. More specifically, this invention relates to an improved method and apparatus for associating various configurations of multichannel devices with the input modules of an audio follow video mixer, either locally or remotely through a serial interface module.

BACKGROUND OF THE INVENTION

In order to accomplish audio editing, it is known to use an audio follow video mixer to control a plurality of multi-channel devices, such as VTRs, for example. It is also known that an editor may be advantageously used to control the mixer via an editor interface to enable various VTR functions, such as PREVIEW/REVIEW and FADE UP/DOWN.

Generally, in a mixer system, a mixer is connected to a plurality of devices such as VTRs or other multi-channel devices. The mixer may also be connected to an editor via an editor interface to permit editor control of the mixer. In this way, the editor may be used to control the processing of the various signals introduced into the mixer.

However, prior systems are limited in that many mixers are designed to edit signals from devices exclusively using the same number of channels. For example, an editor may be limited in controlling input to a mixer from devices all of which have only two channels. In order to circumvent this limitation, it is possible to use hard wire jumpers. However, this solution has the drawback of being time-consuming and complicated, especially where several devices are used. Each time a different device is introduced, for example, a two-channel device replacing a four-channel device, rewiring becomes necessary.

A scheme incorporating an improved method of configuring such mixer systems is described in U.S. Pat. No. 5,175,771 which utilizes a configuration selector to choose a desired configuration of multi-channel devices. This permits configuration selection in conjunction with a video editor.

While allowing the use of various combinations of multi-channel devices, the improved scheme of U.S. Pat. No. 5,175,771, is limited in versatility in that each multi-channel device must be assigned to a particular series of mixer channels. For example, a four channel VTR might be assigned to mixer channels 1, 2, 3, and 4 when, at times, it may be desired that the VTR be coupled to mixer channels 1, 2, 5 and 6, reserving channels 3 and 4 for other uses.

This limitation of prior mixer systems is more pronounced when a modular type of mixer is used. In such a mixer, various types of modules can be easily substituted to increase the possible uses of the mixer system. For example, ten bays may be used to accept all mono modules, or selected monaural modules may be replaced with stereo modules or dual modules. However, this creates a difficulty in providing access for associated multi-channel devices to all functions which may be performed by the mixer system. For example, a difficulty arises in providing an associated VTR access to the voltage controlled amplifier (VCA) and preview lines in a mixer while retaining the flexibility provided by a modular system.

Thus, there is a need to provide a more flexible mixer system in which various configurations of associated multi-channel devices may be selected. More particularly, there is a need to provide a mixer system which better utilizes the versatility provided by a video editor used to control a modular type mixer. There is a related need to provide a system in which different configurations of multi-channel devices may be set remotely from a video editor console. There is a need to ensure that various combinations of multi-channel devices used in a mixer system may access the full range of audio signal processing functions provided by the mixer system. Finally, there is a need to provide a simple method of selecting a VTR to be associated with each of a plurality of mixer input modules without using a fixed or preprogrammed configuration scheme.

SUMMARY OF THE INVENTION

A general object of this invention is to overcome these and other drawbacks of the prior art by providing a mixer comprising means for providing a plurality of input audio channels from a plurality of input devices to the mixer; means for coupling each input audio channel of the input devices with a plurality of mixer audio channels, the coupling means including configuration indicator means for providing a first set of control signals indicating the input device and audio channel coupled to each of the mixer audio channels; configuration memory means for storing a preset configuration of input devices associated with each of the plurality of mixer audio channels, the configuration memory means providing a second set of control signals; and configuration control means for providing configuration control signals to the coupling means according to the first set of control signals or the second set of control signals.

According to an embodiment of the invention, the mixer further includes a serial communication interface means for coupling the mixer with a video editor, the video editor providing editor control signals to the configuration control means.

According to yet another embodiment of the invention, the mixer further includes display means for visually indicating each input device coupled to each mixer audio channels.

According to still another embodiment, the configuration memory means and the configuration control means are located in a serial interface module.

According to yet another embodiment the configuration control means includes a central processing unit (CPU).

According to another embodiment the configuration memory means includes means for assigning a particular configuration to a particular memory location whereby the particular configuration may be recalled according to the second set of control signals.

BRIEF DESCRIPTION OF THE DRAWINGS

FIG. 3A1-3A2 are a front view of a mixer input module according to one embodiment of the present invention.

FIG. 3B1-3B2 are a front view of a mixer serial interface module according to one embodiment of the present invention.

DETAILED DESCRIPTION OF THE PREFERRED EMBODIMENT

Figure 1:
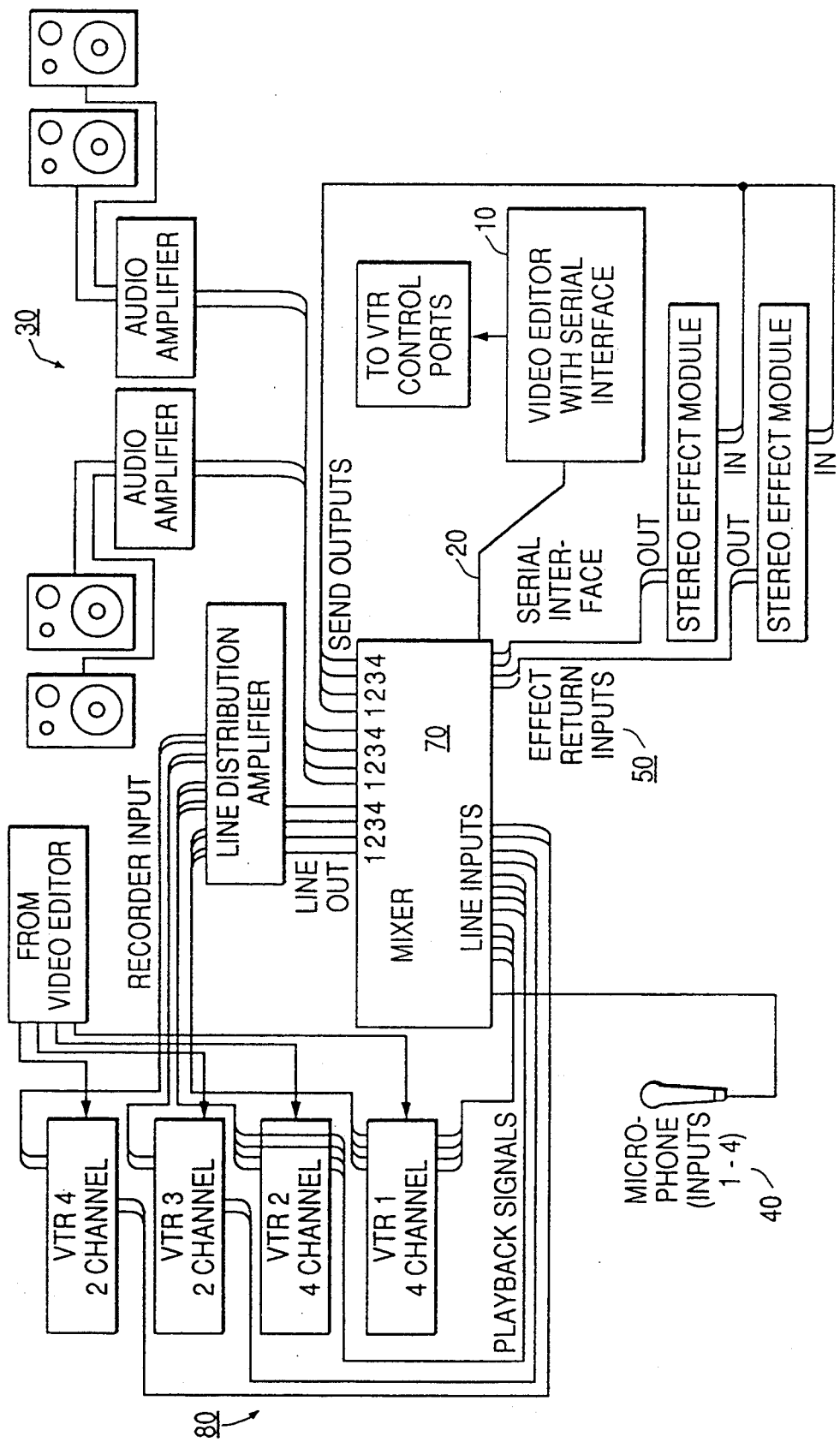
FIG. 1 is a representation of a mixer system according to the present invention.

FIG. 1 is a representation of a mixer system according to the present invention as used in a typical application. The system of FIG. 1 includes an editor 10 connected through a serial editor interface cable 20 to an audio follow video mixer 70. A plurality of multi-channel devices 80 are connected to the mixer 70 through several line input ports on the mixer. For convenience only, the following description will refer to VTRs, but it is to be understood that the invention is not so limited. Other devices, including other multi-channel devices, may be used with this invention.

As shown in FIG. 1, the editor 10 controls the operation of the audio follow video mixer 70 according to the signals from the video editor 10 supplied to a serial interface in ther mixer 70. The video editor 10 may also control the VTRs 80 through VTR control ports located on the VTRs. Other peripheral devices, such as monitor devices 30, microphone inputs 40, and effects devices 50 may be supplied to aid in mixing. With such a system, an operator of the video editor 10 may process several channels of input supplied to the mixer from different combinations of VTRs 80.

Figure 2:
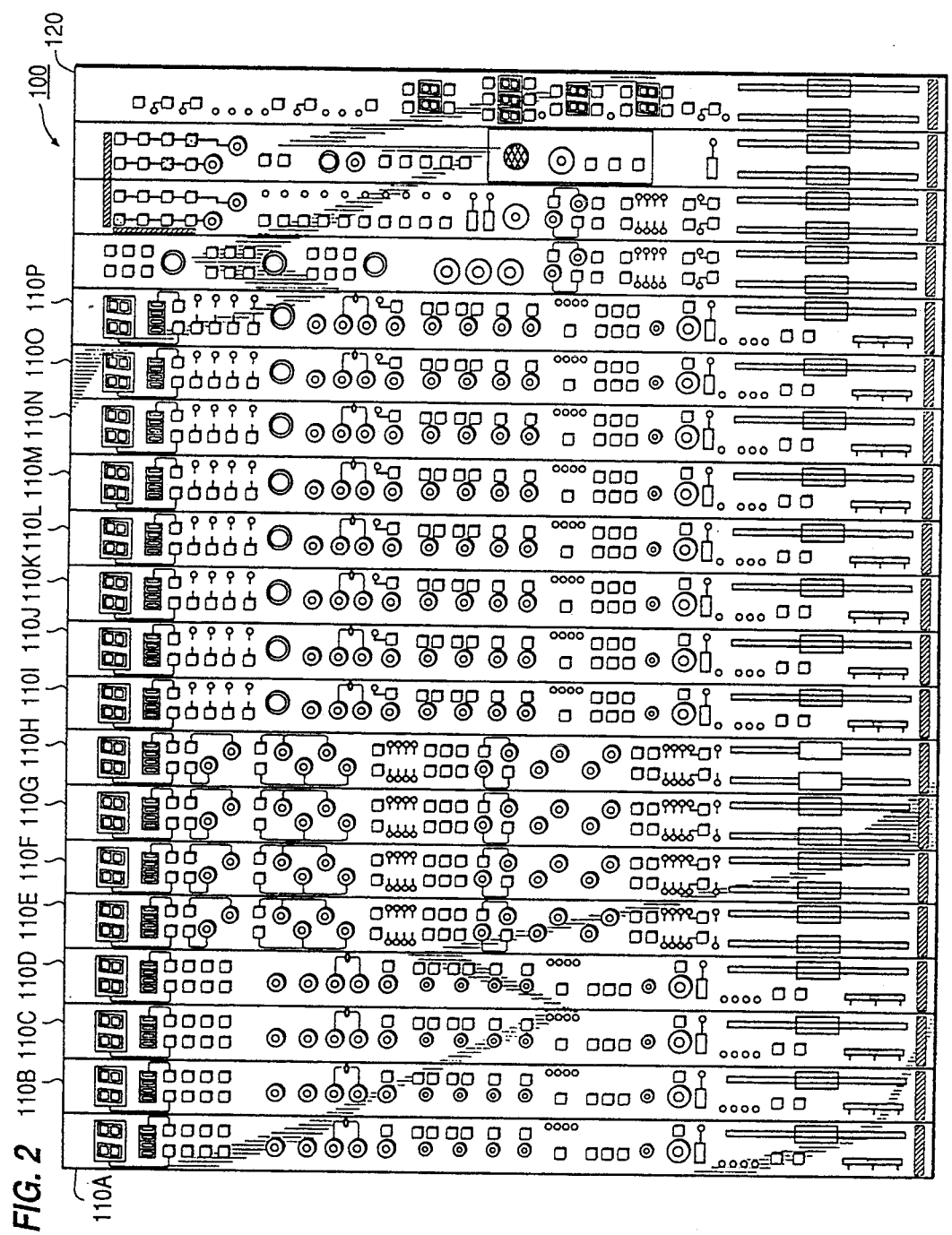
FIG. 2 is front view of a mixer console incorporating the present invention.

FIG. 2 shows a front view of a mixer console 100 according to an embodiment of the invention. In the mixer 100 shown, sixteen input modules 110A, 110B, 110C, 110D, 110E, 110F, 110G, 110H, 110I, 110J, 110K, 110L, 110M, 110N, 110O and 110P are present in the mixer console 100. As illustrated, these input modules may be of several different types, for example, dual, stereo or monaural. Regardless of which type of module that is used, VTR selection may be performed similarly according to the present invention, as described below.

Also shown on the mixer console is a serial interface module 120. This module provides an interface between the mixer 100 and a video editor console, for example, as shown in FIG. 1. In combination with the input modules 110A through 110P, the serial interface module 120 allows a user to set a VTR configuration by uploading configuration information from a video editor to the serial interface. Alternatively, the configuration may be set at the input modules 110A through 110P, and configuration information provided to the video editor via the serial interface module 120.

In order to utilize the mixer console 100 to process the various input channels from several VTRs, it is necessary to configure each input module 110A through 110P so that it is associated with a particular VTR. For example, a first VTR, such as VTR 1 of FIG. 1, supplies a four channel input which may be supplied to any combination of monaural-, stereo- or dual-type modules in the audio follow video mixer. Once a particular input configuration has been selected, it is necessary to configure the input module receiving an input channel in accordance with the VTR supplying the input channel.

Figures 1, 3A:
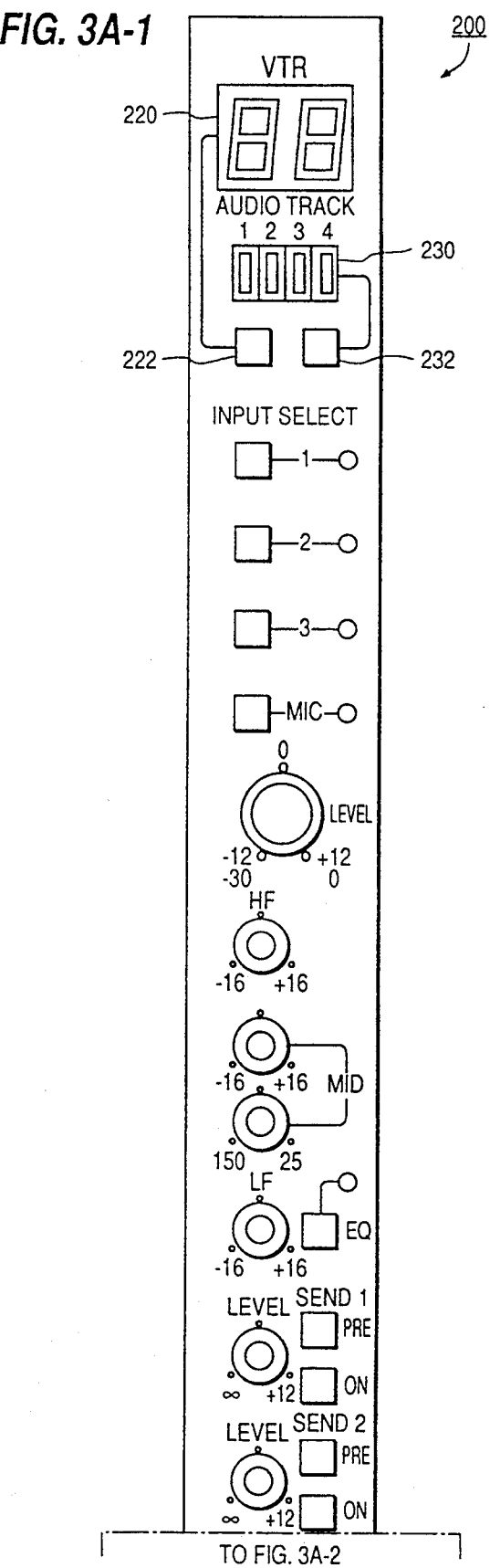
Figures 2, 3A:
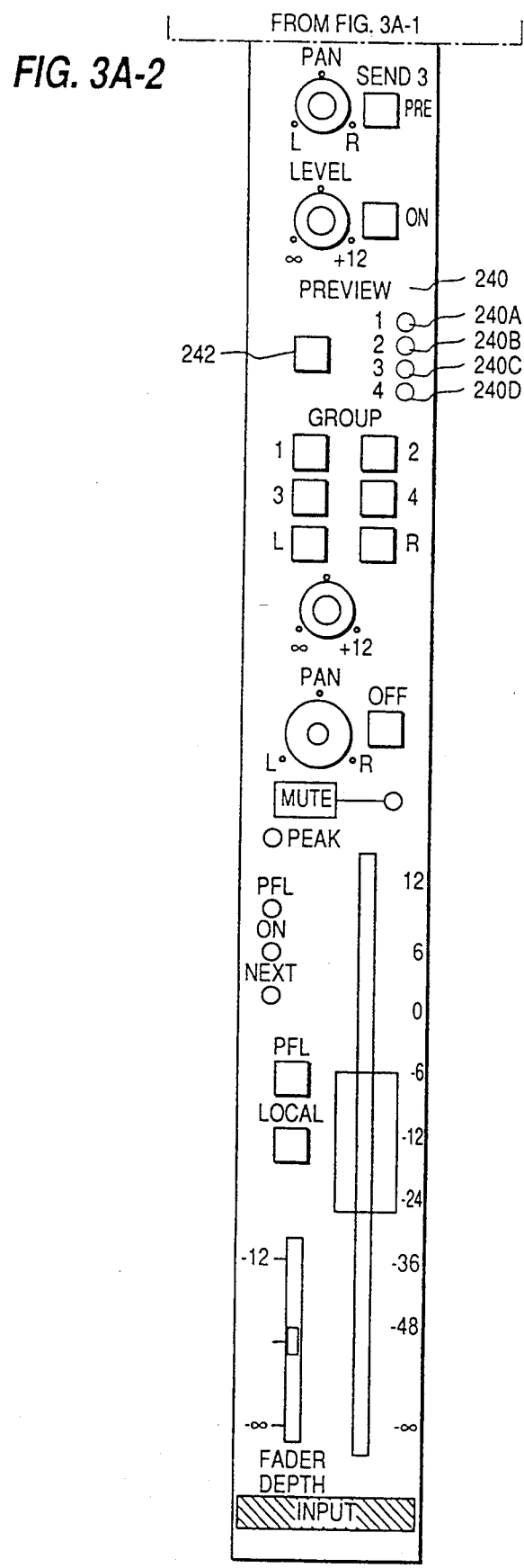

FIG. 3A shows a front-view of an input module 200 by which the configuration of an audio follow video mixer may be set. In the example shown, a monaural-type module is illustrated. On the module console is a dual seven segment LED display 220 which displays the number of the VTR which has been selected. The VTR number is selected by pressing a machine select button 222 located below a four bar LED display 30. On initial power up, the VTR configuration display 220 will indicate the last assigned machine number. When the machine select button 222 is pressed, the display will increment to the next number. For example, the module 210 may be constructed to allow the numbers to increment from "RC" (record machine), then through numbers one through sixteen. However, the mixer input modules may be designed to utilize any number of VTRs. For example, instead of using sixteen VTR configuration numbers, thirty-two may be chosen.

Also shown in FIG. 3A is a four segment bar LED 230. This display serves as a VTR audio assignment indicator for the mixer input module 200. This display shows which audio channel, from one to four, of the assigned VTR is assigned to the module. The audio channel of the VTR can be assigned to the mixer input module 200 by pressing the channel select button 232 located below the display 230. On initial power up, the display will indicate the last assigned channel. When the channel select button is pressed, the channel select indicator will increment to the next segment bar LED. The display will cycle through each of the bar segments which correspond to audio channels one to four.

Assigning the VTR audio track to the module in this way will also automatically assign the selected channel to the preview bus of the mixer. For example, if channel one is chosen, then the audio of the input module will be routed to a first preview bus. If channel two is chosen, then audio channel two will be routed to a second preview bus. A similar routing takes place for channels three and four. The preview bus to which a selected audio channel is assigned is displayed by an indicator display 240. In this example, this display includes four individual LEDs 240A, 240B, 240C and 240D, that indicate to which preview bus the selected audio channel is assigned. Each of the four LED indicators 240A, 240B, 240C, and 240D corresponds to a particular preview bus.

The preview bus to which a selected audio channel is assigned may be changed by pressing the preview bus select button 242. Operation of the preview bus select button 242 will not effect the audio channel assignment to the mixer input module 200; rather, only the preview by assignment of a selected audio channel will be changed. Any change of preview bus assignment will be indicated by the preview bus indicator display 240.

Figures 1, 3B:
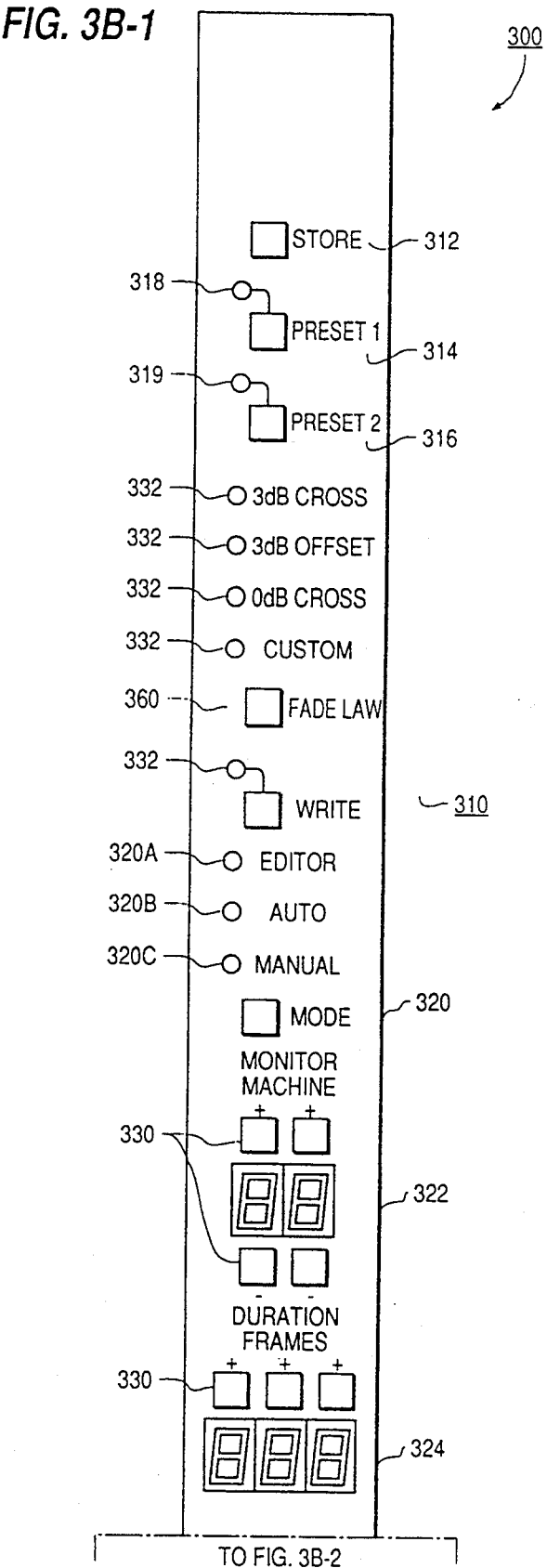
Figures 2, 3B:
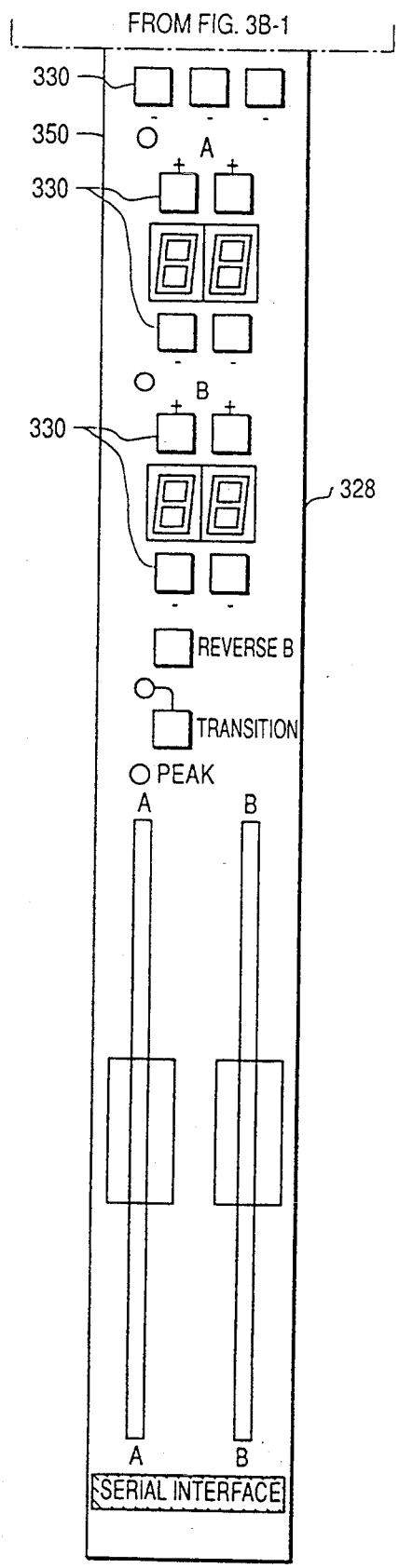

FIG. 3B shows a serial interface module console 300 by which the audio follow video mixer system configuration may be set. In this embodiment, several control switches and indicators are provided at a top portion 310 of the serial interface module console 300. These switches may be used to select various operating functions of the audio follow video mixer system.

In this embodiment, selection of various configurations of the audio follow mixer video system is facilitated by use a "store" function which allows a user to place a specific configuration in memory. As shown, the serial interface module console includes a store button 312 along with two preset buttons 314 and 316 labelled respectively PRESET 1 and PRESET 2. According to this example, once a specific arrangement of VTRs or other multi-channel devices is selected by operation of the various input modules as described above, the configuration may be assigned to one of two memory locations. This is accomplished by depressing the store button 312 which thereby arms the store function, and then pressing either the preset 1 button 314 or the preset 2 buttom 316. The configuration information is then stored accordingly, for example, in one of two memory locations. These memory locations may be comprised of either volatile, or nonvolatile memory.

More specifically, each input module incorporated into the audio follow video mixer system may be provided with an automatic identification means which provides a signal to the serial interface module through the mixer bus lines. These signals may indicate the type of input module and its location in the mixer console. For example, control signals provided by each input module would indicate whether it was a stereotype, monaural-type, or dual-type module, and further indicate its preview bus, input machine, and audio channel assignment. The signals corresponding to the system configuration can then be stored for repeated use in a memory location.

For example, once configuration is stored in either the preset 1 or the preset 2 memory locations, it can be recalled simply by depressing either the preset 1 buttom 314 or the preset 2 button 316. This operation resets the configuration by initiating control signals indicating VTR, audio channel, and preview bus assignments to be sent from the serial interface module to the input modules. The configuration that is currently in use will be indicated by preset indicator LEDs 318 and 319. That is, if the preset 1 button 314 is depressed, the audio follow video mixer will be configured such that the VTR assignment, audio channel assignment and preview bus assignment of the input modules will be reset to a configuration stored in the preset 1 memory location; the preset 1 configuration will be indicated by illumination of the preset 1 indicator LED 318.

Further shown in this embodiment of the invention, there is provided a mode select button 320 located on the control portion 310, and a plurality of mode indicator LEDs 320A, 320B, and 320C to visually indicate the operating mode of the audio follow mixer video system. By pushing the mode select button 320, the operator may toggle through various operating modes. For example, the initial mode at power-up may be "EDITOR" mode. While in this mode, an EDITOR mode LED 320A will be illuminated. If the mode select button is then pushed, the mixer will change to an "AUTO" (local) mode, and the AUTO mode LED indicator 320B will be illuminated. If the mode select button is pushed again, the mode will be switched to a "MANUAL" mode, and the MANUAL mode LED indicator 320C will be illuminated. This cycle may be repeated by continuing to depress the mode select button 320. In this way, the mixer system can be operated under control of a video editor or operated locally.

While operating under editor control, the serial interface module 300 may provide control signals in the form of serial data signals to a video editor. These control signals are used to indicate which particular configuration of VTRs or the like has been selected. In this way various functions, for example, previews/reviews may be performed by the mixer system under control of the video editor. The operation of the mixer is visually indicated by LED displays 322, 324, 326, and 328 which show respectively the number of the monitor machine, the duration of a crossfade, the machine from which an active audio channel is provided (the "from machine" A), and the machine whose associated audio channel will be faded in to full gain (the "to machine" B). While not in editor mode, the monitor machine, the transition duration, as well as the from and to machines may be selected by various control buttons 330 located on the serial interface module console. The remaining buttons, switches and indicators 332 located in the control portion 310 of the serial interface module 300 are used to control various editing and monitoring operations of the mixer once a configuration has been selected.

Figure 4A:
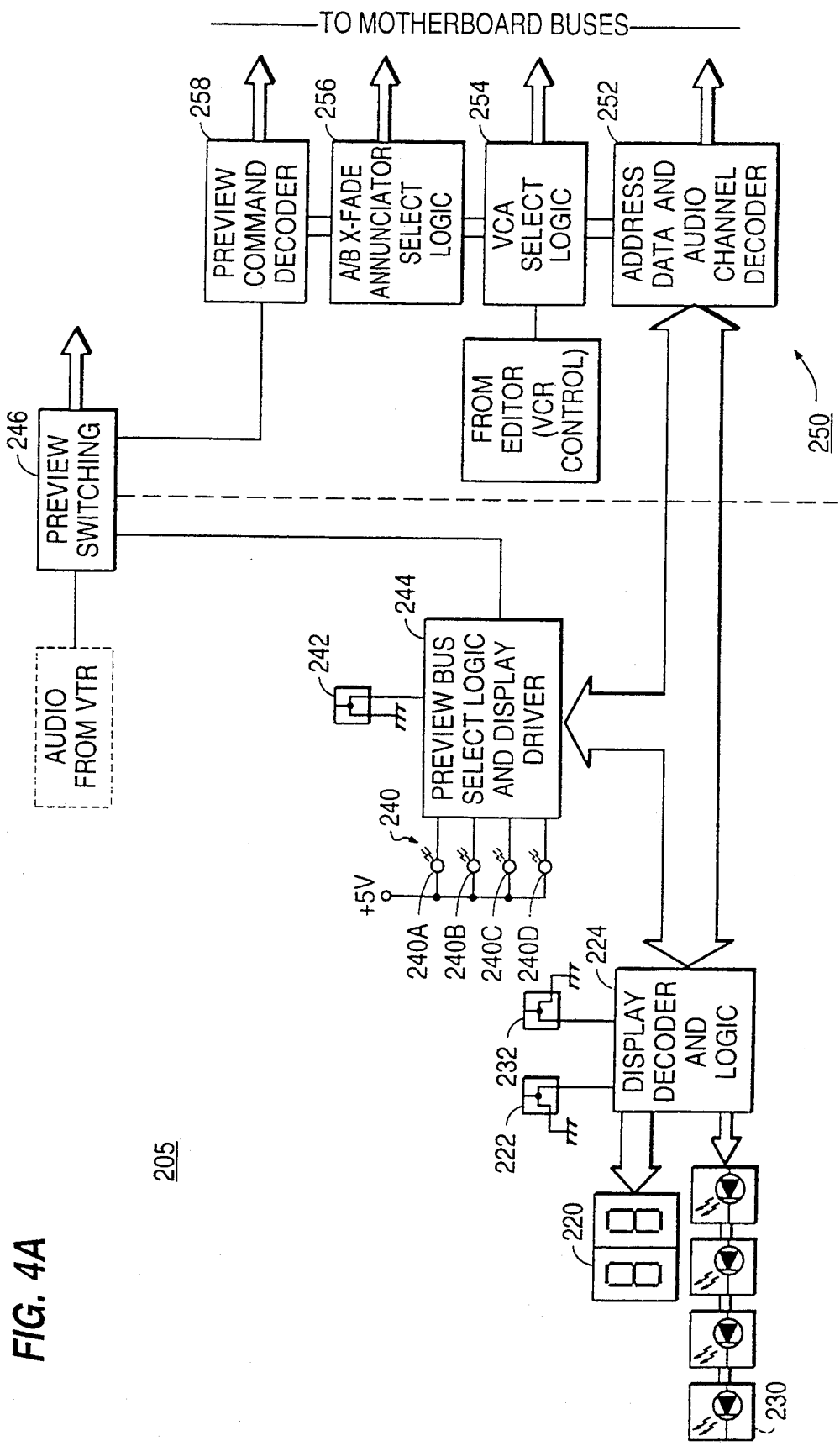
FIG. 4A is a schematic diagram of a mixer input module according to an embodiment of the present invention.
Figure 4B:
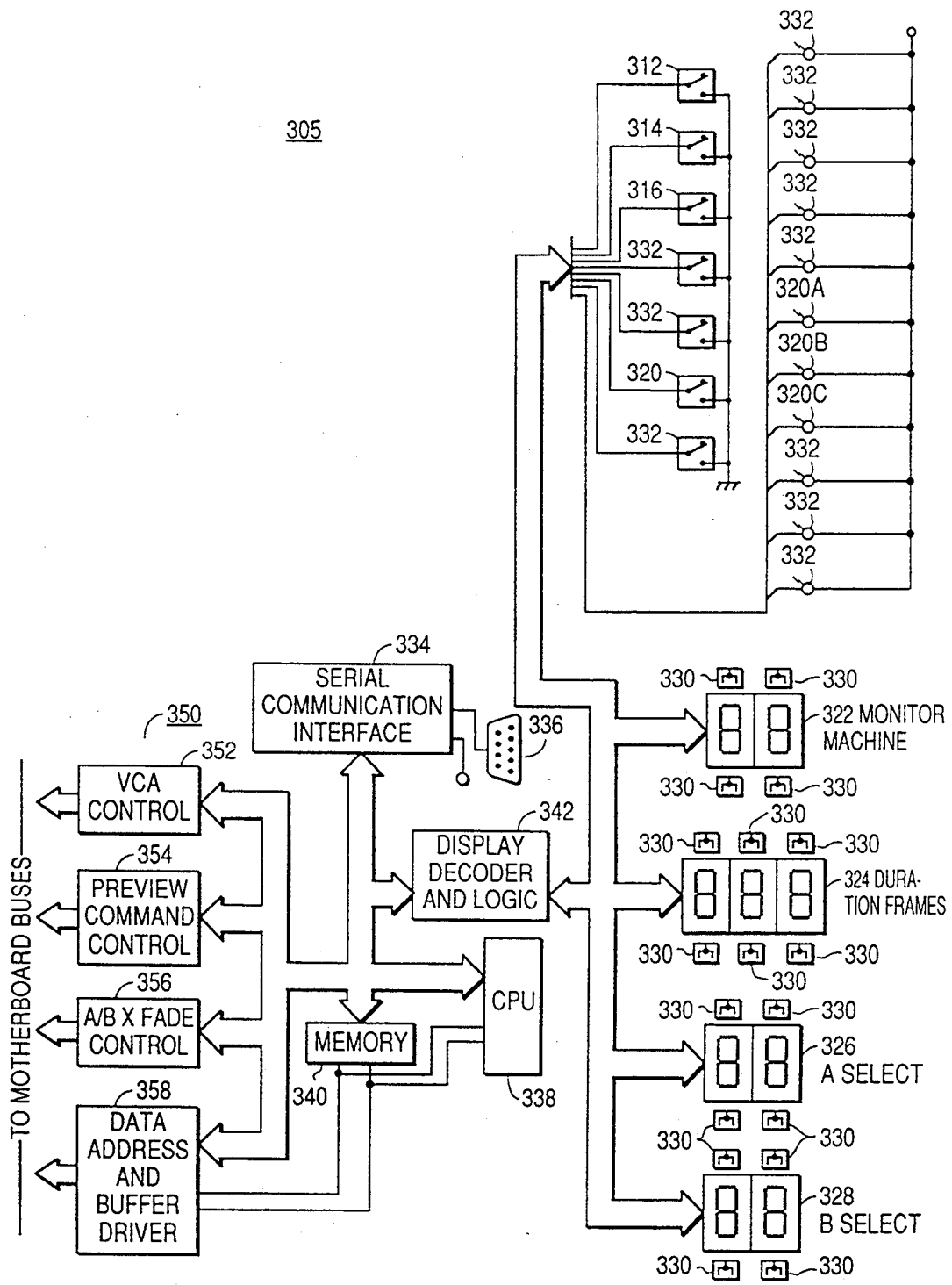
FIG. 4B is a schematic diagram of a serial interface module according to an embodiment of the present invention.

FIGS. 4A and 4B illustrate a circuit configuration which may be used to implement the embodiment described in reference to FIGS. 3A and 3B. In FIG. 4A, a machine select button is shown at reference numeral 222, which is used to select the VTR assigned to the mixer input module. When the machine select button 222 is depressed, the display decoder and logic circuit 224 detects this operation and sends out control signals to the dual seven segment LED display 220, which displays the number of the selected VTR as discussed above. Control signals are also sent from this circuit to buses located on the mother board of the audio follow video mixer via several control circuits 250 (i.e., the illustrated circuits 252, 254, 256 and 258). In this way, signals supplied by a VTR connected to the line input of the input module are available for processing by the audio follow video mixer. The configuration display provides the operator with visual confirmation that the correct VTR has been selected.

Similarly, the operator may select the audio channel for the input module by depressing the channel select button 232. This operation causes the display decoder and logic circuit to send signals that illuminate the appropriate bar segment of LED 230. As with the VTR configuration selection, signals indicating the selected audio channel are provided to buses on the mixer mother board via control circuits 250.

The display decoder and logic circuit 224 is also coupled to a preview bus select logic and display driver circuit 244. This circuit drives the appropriate LED indicator 240A, 240B, 240C or 240D, to provide a visual indication of which preview bus is available to the selected audio channel. A preview bus assignment may be changed by depressing the preview bus select switch 242. This operation toggles the preview bus LED indicators and initiates control signals to be sent via the preview bus select logic and display driver circuit 244 to make available the desired preview bus. These control signals are input to a preview switching circuit 246, which routes the audio channel signals from the input VTR accordingly.

The control circuits located on the mixer input module couple the display decoder and logic circuit 224 and the preview bus select and display driver circuit 244 with the various buses located on the motherboard of the mixer. As shown, these control circuits include an address data and audio channel decoder circuit 252, a VCA select logic circuit 254, an A/B cross fade annunciator select logic circuit 256 and a preview command decoder circuit 258. These circuits 250 control the processing of the selected audio channel associated with the VTR coupled to the module.

FIG. 4B is a representation of a serial interface circuit 305 according to an embodiment of the invention. In this circuit, serial communication with a video editor is provided by use of a 9-pin connector 336 coupled to a serial communication interface circuit 334. This provides an interface between the audio follow video mixer and a video editor by which the above-described control signals can be uploaded and downloaded.

The serial interface circuit further includes a central processing unit (CPU) 338 and a memory means 340. The memory provides control signals to the CPU 338 and further contains locations in which preset configurations may be stored. Particular configurations are displayed via a display decoder and logic circuit 342 which controls operation of the various indicators described above. For example, the display decoder and logic circuit circuit 342 is provided to control the operation of the monitor machine display 322, the duration frame display 324, from machine display 326, and to machine display 328, as well as operation of the control buttons 330 that control the functions corresponding to these displays, as described above. The display decoder and logic circuit is further coupled to the above-described control buttons and indicators 332 located on the control portion 310 of the serial interface module console.

These circuit elements are further coupled along bus lines in the serial interface module to various control circuits 350 which are further coupled to the buses located on the motherboard of the audio follow video mixer. These control circuits 350 include a VCA control circuit 352, a preview command control circuit 354, an A/B crossfade control circuit 356, and a data address and buffer driver circuit 358. These control circuits 350 provide means for controlling various operations of the audio channels provided to the mixer system according to control signals received from a video editor, or provided locally from the control portion 310 of the serial interface module console.

As this embodiment makes apparent, it is possible to configure a mixer system in a variety of different ways, either locally using the individual input modules or according to preset configurations. According to the invention, it is possible to couple an audio follow video mixer with several different combinations of devices having single or plural channel inputs. Furthermore, greater versatility is achieved in that the different channels of an associated multi-channel device can be coupled to the mixer through non-consecutive line input ports in a convenient manner. That is, since each input module can be assigned to any of a number of different VTRs or other devices, it is no longer necessary to use hardwired jumpers or a fixed configuration scheme to provide each channel of an input device to any input of a mixer.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A mixer comprising:
   means for providing a plurality of input audio channels from a plurality of input devices to the mixer;
   means for coupling each input audio channel of the input devices with a corresponding one of a plurality of bus lines;
   configuration input means for providing a set of control signals indicating the input device from which each input audio channel is received and the bus line to which each input audio channel is operatively coupled;
   configuration memory means for storing a preset configuration of input devices associated with each of the plurality of mixer audio channel; and
   control means operatively coupled to said configuration input means and said configuration memory means for providing configuration control signals between said configuration control means and said configuration memory means, whereby a configuration of devices is entered with said configuration input means and saved by said configuration memory means;
   wherein the configuration memory means and the configuration control means are located in a serial interface module.

2. The mixer according to claim 1 wherein the configuration control means includes a central processing unit (CPU).

3. The mixer according to claim 1, further including display means for visually indicating the input device from which each input audio channel is received and the bus line to which each input audio channel is operatively coupled.

4. The mixer according to claim 1 wherein the configuration memory means includes means for storing a particular configuration in a particular memory location whereby the particular configuration may be recalled.

5. The mixer according to claim 4, wherein said serial interface module operatively couples the mixer to a video editor, the video editor providing editor control signals to the configuration control means and receiving data from said configuration control means which indicates a current configuration of input devices which provide said input audio channels to the mixer, said editor control signals including signals which initiate a recall of a particular configuration stored in said memory means.

6. An audio follow video mixer comprising:
   a plurality of input modules which couple the mixer with a plurality of input audio channels associated with a plurality of audio devices;
   a machine select member provided on each input module operable to identify to which of said plurality of audio devices the input module is coupled;
   a motherboard including a plurality of bus lines, said input audio channels being supplied to said plurality of bus lines via said plurality of input modules;
   a control module including a memory and a microprocessor, said microprocessor and said memory being operatively coupled to each machine select member through said motherboard whereby the identity of the audio device to which each input module is coupled is obtained by said microprocessor and stored in said memory; and an interface device provided in said control module, said interface device transmitting data between said microprocessor and a video editor, said data indicating the identity of the audio device to which each input module is coupled.

7. The audio follow video mixer according to claim 6 wherein the control module further includes a preset select member for selecting a preset configuration of audio devices and input modules stored in the memory means.

8. The audio follow video mixer according to claim 7 wherein the control module further includes a store select member for implementing storage of said configuration of audio devices and input modules in the memory means.

9. The audio follow video mixer according to claim 6 wherein said plurality of bus lines includes preview bus lines and the video mixer further comprises a channel select member provided on each input module operable to selectively route an input audio channel coupled to the input module on which the channel select module is provided to one of said plurality of preview bus lines.

10. The audio follow video mixer according to claim 6 further including display means provided on each input module and operatively coupled to each said machine select member for visually indicating which of said plurality of audio devices the input module is coupled.

11. An audio follow video mixer system comprising:
a plurality of audio devices, including at least one multi-channel audio device;
a mixing console including a plurality of input modules, a communications interface, and a plurality of bus lines, said plurality of audio devices being operatively coupled to said mixing console via said input modules;
a video editor operatively coupled to said audio devices and to said mixing console through said communications interface, said video editor providing signals to control operation of the audio devices and the mixing console;
a machine select member provided on each input module operable to identify to which of said plurality of audio devices the input module is coupled;
a processor provided in said mixer console which is operatively coupled to said machine select member and to said video editor through said interface, said processor providing signals to said video editor which indicate the identity of the audio device to which each input module is coupled.

12. The audio follow video mixer of claim 11 further comprising a channel select member provided on each input module operable to selectively route an input audio channel from the audio device to which the input module is coupled to one of said plurality of bus lines.

13. The audio follow video mixer of claim 12 further comprising a display provided on each input module and operatively coupled to each said machine select member for visually indicating which of said plurality of audio devices the input module is coupled.

14. The audio follow video mixer of claim 11 further comprising a channel select member provided on each input module operable to selectively route an input audio channel from the audio device to which the input module is coupled to one of said plurality of bus lines.

15. The audio follow video mixer of claim 14 further comprising a display provided on each input module and operatively coupled to each said channel select member for visually indicating which of said plurality of bus lines said audio channel is coupled.

16. The audio follow video mixer of claim 14 wherein said video editor provides data to said processor indicating to which of said plurality of audio devices the input module is coupled.

17. The audio follow video mixer of claim 11 further comprising a memory operatively coupled to said processor, said memory storing data indicating the audio device to which each input module is coupled.

18. The audio follow video mixer of claim 17 further comprising a store member provided on said mixer console and operatively coupled to said processor and said memory, said store member being operable to store a current configuration of audio devices and input modules in said memory.

19. The audio follow video mixer of claim 18 wherein said video editor provides signals to said processor which recalls a configuration of audio devices and input modules stored in said memory.

20. The audio follow video mixer of claim 18 further comprising a preset member provided on said mixer console and operatively coupled to said processor and said memory, said preset member being operable to recall a configuration of audio devices and input modules stored in said memory.

21. The audio follow video mixer of claim 17 wherein said mixer console includes an interface module in which said processor, said interface and said memory are provided.

* * * * *